United States Patent [19]

Bier et al.

[11] Patent Number: 4,743,638
[45] Date of Patent: May 10, 1988

[54] RAPID CRYSTALLIZING POLYPHENYLENE SULPHIDE COMPOSITIONS

[75] Inventors: Peter Bier, Pittsburgh, Pa.; Klaus Reinking, Wermelskirchen, Fed. Rep. of Germany; Ludwig Bottenbruch; Erhard Tresper, both of Krefeld, Fed. Rep. of Germany

[73] Assignee: Bayer Aktiengesellschaft, Leverkusen, Fed. Rep. of Germany

[21] Appl. No.: 19,475

[22] Filed: Feb. 26, 1987

[30] Foreign Application Priority Data

Mar. 8, 1986 [DE] Fed. Rep. of Germany ....... 3607714

[51] Int. Cl.$^4$ .............................................. C08K 5/52

[52] U.S. Cl. ................. 524/141; 264/331.11; 524/143; 524/609

[58] Field of Search ............... 264/331.11; 428/419; 525/537; 528/388; 524/141, 143, 609

[56] References Cited

U.S. PATENT DOCUMENTS 4,212,793  7/1980  Shue ..................................... 524/141
4,501,713  2/1985  Wright ................................. 528/388

Primary Examiner—Veronica P. Hoke
Attorney, Agent, or Firm—Connolly & Hutz

[57] ABSTRACT

The invention relates to highly crystalline, rapid-crystallizing, thermoplastic compositions of polyphenylene sulphides and aromatic phosphoric acid esters.

4 Claims, No Drawings

RAPID CRYSTALLIZING POLYPHENYLENE SULPHIDE COMPOSITIONS

The invention relates to highly crystallined, rapid-crystallizing, thermoplastic compositions of polyphenylene sulphides and aromatic phosphoric acid esters.

Polyphenylene sulphides can be used as raw materials for preparing fibres, sheets and shaped articles. Owing to their partly crystalline structure, they have excellent properties, for example high wear resistance, favourable creep resistance properties and high dimensional accuracy. They are therefore highly suitable for the production of mechanically and thermally highly stressed parts.

An additional improvement in the mechanical properties can be obtained by incorporating reinforcing materials, for example glass fibres.

However, the production of shaped articles from polyphenylene sulphide by injection moulding is problematical since high mould temperatures (>130° C.) and relatively long moulding times are necessary. Most injection moulding processors cannot use mould temperatures of >130° C. and more since the moulds are normally designed for a temperature around 100° C. (heating agent water). Mould installations which are operated with other heating agents, for example oil, and attain temperatures of >110° C. are generally rare, and their use poses problems. Very frequently even they in practice do not attain the desired temperatures, and the temperature distribution is uneven. Owing to these disadvantages, it can be economically unrecommendable to use such high mould temperatures in the injection moulding sector.

Furthermore, it is desirable to attain high crystallinity as rapidly as possible in order to obtain optimum properties. High crystallinity ensures hardness, dimensional stability, and shape stability, even at relatively high temperatures. Also dependent on the mould residence time is the length of the injection moulding cycle which codetermines the economics.

These cycles are relatively long even at the high mould temperatures for the processing of polyphenylene sulphide and hinder the advance of polyphenylene sulphide in the production of injection mouldings.

It has now been found that the polyphenylene sulphides have higher crystallinity and crystallize more rapidly when they contain 0.5-30% by weight, relatively to polyphenylene sulphide, or aromatic phosphoric acid esters. This allows the degree of crystallinity required for high shape stability to be reached more rapidly and the polyphenylene sulphide compositions thus to be processed in much shoter injection cycles.

A further advantage of the polyphenylene sulphide compositions according to the invention consists in the reduction of the mould temperature without the advantageous crystallization properties being impaired. The injection moulding composition cools down more rapidly, thus further reducing the mould residence time.

The invention relates to highly crystalline, rapid-crystallizing thermoplastic compositions consisting of:

(a) 70-99.5, preferably 90-98.5, particularly preferably 93-97, % by weight of a polyphenylene sulphide having a melt viscosity of at least 5 Pas, preferably of at least 50 Pas to 1200 Pas (measured at 306° C. under a shearing stress of $10^3$ Pa) and (b) 0.5-30, preferably 1.5-10, particularly preferably 3-7, % by weight, relative to (a) and (b), of an aromatic phosphoric acid ester of the formula (I)

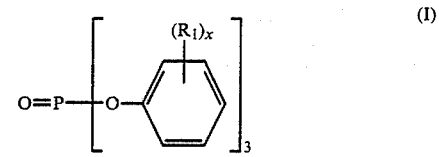

in which $R_1$ represents one or more identical or different $C_1$–$C_{24}$-aliphatic, $C_3$–$C_{13}$-cycloaliphatic and/or $C_6$–$C_{18}$-aromatic radicals and x represents the number 0, 1, 2, 3, 4 or 5.

Such esters are for example triphenyl phosphate, tricresyl phosphate, diphenyl cresyl phosphate and triisooctylphenyl phosphate.

The present invention further relates to a process for preparing highly crystalline, rapid-crystallising, thermoplastic compositions, which is characterized in that 70-99.5, preferably 90-98.5, particularly preferably 93-97, % by weight of a polyphenylene sulphide having a melt viscosity of at least 5 Pas, preferably of at least 50 Pas to 1200 Pas (measured at 306° C., under a shearing stress of $10^3$ Pa) and 0.5-30, preferably 1.5-10, particularly preferably 3 to 7, % by weight of an aromatic phosphoric acid ester are mixed by adding the phosphoric acid ester to the polyphenylene sulphide melt and homogenizing the mixture in the melt.

The polyphenylene sulphide compositions according to the invention are thermoplastically processible and can be used for injection moulding. In injection-moulding processing a mixture of a polyphenylene sulphide and an aromatic phosphoric acid ester of the formula (I) can be cast into moulds which have a temperature of up to about 120° C., the amount of phosphoric acid ester being chosen in such a way that the injection-moulded polyphenylene sulphide has at least 70% of the crystallinity which is obtained when injection moulding a moulding from unmodified polyphenylene sulphide at mould temperatures of at least 130° C. A suitable measure of crystallinity is for example the heat of fusion as determinable with TLC apparatus.

Polyarylene sulphides can be prepared in a known manner from dihalogenoaromatics and alkali metal sulphides in solution (for example U.S. Pat. No. 2,513,188).

The aromatic phosphoric acid esters of the formula (I) usable according to the invention can be prepared for example by means of the known reaction of phosphorus oxychloride with the corresponding alcohols or phenols. Another, known way consists for example in the oxidation of phosphites, such as, for example, triochloroethyl phosphite to the phosphate. The various methods of preparation and the products are described, inter alia, in Dr. Kurt Thinius: Chemie, Physik und Technologie der Weichmacher [Chemistry, Physics and Technology of Plasticizers], VEB Verlag Technik Berlin 1960, pages 400–452.

The preparation of the mixture of polyphenylene sulphides and phosphoric acid esters can be carried out on commercially customary mixing apparatuses. Suitable such apparatuses are kneaders and single-screw and twin-screw extruders. For further processing, the mixture obtained can be granulated after the melt has solidified.

The polyphenylene sulphide compositions can additionally contain fillers and/or reinforcing materials in the form of powders, fibres or mats. Examples thereof are metals such as steel, copper, aluminium or carbon. Preferred fillers are quartz, talcum or kaolin, preferred reinforcing materials are glass fibres. Preferred quantities of fillers, relative to the total compound, are those between 5 and 60% by volume.

The compositions can optionally further contain inorganic pigments, such as, for example $TiO_2$, ZnS, phthalocyanine, carbon blacks, Cd pigments, spinels or organic dyestuffs, flow aids, mould release agents such as, for example, hydrocarbon waxes, ester waxes, amide waxes, UV absorbers and/or stabilizers.

To further increase the flame resistance of the products, they can additionally contain customary flame-retarding additives such as, for example, those which contain halogen, phosphorus, phosphorus nitride, optionally in combination with oxides of the elements of subgroup V such as, for example, antimony oxide.

The rate of crystallization of the polyphenylene sulphide compositions can be further increased by adding inorganic or organic nucleating agents. This is carried out in the usual way with injection moulding compositions.

The amounts are 0.05 to 5, preferably 0.1 to 1% by weight. The preferred nucleating agent is microtalcum.

The polyphenylene sulphide compositions according to the invention are excellent starting materials for preparing sheets and fibres, preferably for preparing shaped articles of any kind of injection moulding.

EXAMPLES

The polyphenylene sulphide compositions according to the invention were prepared by mixing and homogenizing the base components (see Table 1) with a 30 mm Werner and Pfleiderer twin-screw extruder at a melt temperature of 310° C. The extrudates, chopped into granules were dried overnight.

The isothermal rate of crystallization of the dried granules was measured by means of a TLC apparatus. Pretreatment of the samples: heated to 330° C., maintained at this temperature for 1 min and quenched in liquid nitrogen. The amorphous samples were allowed to crystallize out isothermally at 110° C. in the TLC apparatus, the change in the heat of crystallization being recorded as a function of time (exothermic peak).

As a measure of the rate of crystallization, the time required to reach the maximum is recorded in Table 1 as a half-value time.

The samples 1–3 according to the invention listed in Table 1 consist of a polyphenylene sulphide having a melt viscosity of 108 Pas (measured at 306° C. under a shearing stress of 1000 Pa), 3.5% by weight of a wholly aromatic phosphoric acid ester, 40% by weight of glass fibres and 5% by weight of microtalcum. Example 7 is a corresponding polyphenylene sulphide sample without phosphoric acid ester, for comparison. Examples 4–6 are corresponding polyphenylene sulphide compositions with phosphoric acid ester having non-aromatic or only partially aromatic radicals.

TABLE 1

| Example | Phosphoric acid ester | Isothermal (110° C.) rate of crystallization half-value time [s] |
|---|---|---|
| 1 | Diphenyl cresyl phosphate | 14 |
| 2 | Tricresyl phosphate | 12 |
| 3 | Triphenyl phosphate | 12 |
| 4 | Tri-2-ethylhexyl phosphate | 40 |
| 5 | Diphenyl-2-ethylhexyl phosphate | 44 |
| 6 | Trichloroethyl phosphate | 50 |
| 7 | — | 43 |

We claim:

1. Highly crystalline, rapid-crystallizing, thermoplastic compositions consisting of
   (a) 70–99.5% by weight of polyphenylene sulphide having a melt viscosity of at least 5 Pascal-seconds, measured at 306° C. under a shearing stress of $10^3$ Pascal units and
   (b) 0.5–30% by weight, relative to (a) and (b) of an aromatic phosphoric acid ester of the formula (I)

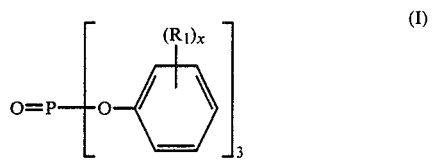

(I)

in which $R_1$ represent one or more identical or different $C_1$–$C_{24}$-aliphatic, $C_3$–$C_{13}$-cycloaliphatic and/or $C_6$–$C_{18}$-aromatic radicals and x represents the number 0, 1, 2, 3, 4 or 5.

2. Process for preparing highly crystalline, rapid-crystallizing thermoplastic compositions wherein 70–99.5% by weight of a polyphenylene sulphide having a melt viscosity of at least 5 Pascal units, and 0.5–30% by weight of an aromatic phosphoric acid ester are mixed by adding the phosphoric acid ester to the polyphenylene sulphide melt and homogenizing the mixture in the melt, said aromatic phosphoric acid ester having the formula

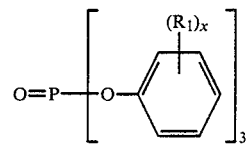

in which $R_1$ represents one or more identical or different $C_1$–$C_{24}$-aliphatic, $C_3$–$C_{13}$-cycloaliphatic and/or $C_6$–$C_{18}$-aromatic radicals and x represents the number 0, 1, 2, 3, 4 or 5.

3. A method of making a moulded article wherein a mixture of 70–99.5% by weight polyphenylene sulphide having a melt viscosity of at least 5 Pascal-seconds, measured at 306° C. under a shearing stress of $10^3$ Pascal units, and 0.5–30% by weight of an aromatic phosphoric acid of the formula

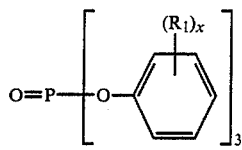

in which

R₁ represents one or more identical or different $C_1$–$C_{24}$-aliphatic, $C_3$–$C_{13}$-cycloaliphatic and/or $C_6$–$C_{18}$-aromatic radicals and x represents the number 0, 1, 2, 3, 4 or 5 is cast into moulds which have a temperature of not more than 120° C., the amount of phosphoric acid ester being chosen in such a way that the moulded polyphenylene sulphide mixture has at least 70% of the crystallinity which is obtained or injection moulding a moulding from the polyphenylene sulphide mixture at mould temperature of at least 130° C.

4. A moulded article prepared by the process according to claim 3.

* * * * *